United States Patent
Grunberger et al.

(10) Patent No.: US 10,386,195 B1
(45) Date of Patent: Aug. 20, 2019

(54) ROUTE GUIDANCE SYSTEM WITH EMERGENCY STATE INDICATIONS

(71) Applicants: Faith Chana Grunberger, Brooklyn, NY (US); Aaron Grunberger, Brooklyn, NY (US)

(72) Inventors: Faith Chana Grunberger, Brooklyn, NY (US); Aaron Grunberger, Brooklyn, NY (US)

(*) Notice: Subject to any disclaimer, the term of this patent is extended or adjusted under 35 U.S.C. 154(b) by 0 days.

(21) Appl. No.: 15/624,848

(22) Filed: Jun. 16, 2017

(51) Int. Cl.
*G01C 21/26* (2006.01)
*G01C 21/34* (2006.01)
*G01C 21/36* (2006.01)
*G08G 1/0968* (2006.01)

(52) U.S. Cl.
CPC ......... *G01C 21/3476* (2013.01); *G01C 21/26* (2013.01); *G01C 21/34* (2013.01); *G01C 21/3611* (2013.01); *G01C 21/3655* (2013.01); *G01C 21/3682* (2013.01); *G08G 1/0968* (2013.01); *G08G 1/096833* (2013.01); *G08G 1/096838* (2013.01)

(58) Field of Classification Search
CPC .................................................. G01C 21/26
See application file for complete search history.

(56) References Cited

U.S. PATENT DOCUMENTS

| | | | |
|---|---|---|---|
| 2006/0111836 A1* | 5/2006 | Fast | G01C 21/3626 701/413 |
| 2006/0184319 A1* | 8/2006 | Seick | G01C 21/28 701/533 |
| 2011/0117878 A1* | 5/2011 | Barash | H04W 4/90 455/404.2 |
| 2012/0313792 A1* | 12/2012 | Behm | G08G 1/0965 340/902 |

* cited by examiner

*Primary Examiner* — Imran K Mustafa

(57) ABSTRACT

A system receives an indication from a first vehicle that the first vehicle is traveling on a drive associated with an emergency to a destination that is associable with the emergency, updates map data to include a representation of the emergency at the location of the first vehicle, and provides the updated map data to a plurality of vehicles executing a navigation application providing route guidance to the plurality of vehicles to respective destinations, so that the instances of the application running for the plurality of vehicles each includes a representation, such as an icon, that represents the indicated emergency at a map location corresponding to the real space location of the first vehicle.

10 Claims, 3 Drawing Sheets

ROUTE GUIDANCE SYSTEM WITH EMERGENCY STATE INDICATIONS

FIELD OF THE INVENTION

The present invention relates to a system and method for generating displays in map and route guidance application including indications of vehicle specific emergency states.

BACKGROUND

Navigation applications for vehicles are known where drivers using an application in their vehicles, for example, running on a vehicle-fixed device or on a personal device, such as a smart phone, connect to a server. The server collects information from many sources, including the many vehicles running the application. Using such information, the server provides navigation maps, routes, and route instructions to the vehicles. Thus, for example, information received by the server from one vehicle using the application is used by the server for updating a display provided on display devices in a number of other vehicles. For example, WAZE is one such app, where a user can provide input, such as an indication of presence of an obstacle on the road or presence of a police officer at a particular location at which the vehicle, whose driver is inputting, the information using the app, is located. The server then updates displays provided in other vehicles, which shown the relevant location, to include an icon representing the indicated item, e.g., a picture of a police officer cap at a particular location on the map to represent the police presence at the location at which the icon is displayed.

Users using such a navigation application input a desired destination, and the application outputs a map with a highlighted route, and, as the vehicle is driven along the route, outputs navigation instructions for reaching the input destination.

SUMMARY

The present application is directed to an improved navigation map and route guidance application that includes functionality for use in case of an emergency. Vehicles are often driven erratically and dangerously in cases of emergency. In such cases, the vehicles, are often driven to particular types of destinations for the purpose of addressing the emergency. For example, in case of a medical emergency, the vehicle can be driven to a hospital, or for other types of emergencies the vehicle can be driven to a local police station, etc. A frequently arising scenario is when a woman goes into labor and a family member drives the woman to a hospital to give birth.

Often, in such situations, the driver breaks certain local driving laws applicable in normal situations, but which are often forgiven due to the emergency circumstances. For example, the driver would not be given a citation for speeding. However, local police authority is not aware of the emergency situation and therefore pursues the vehicle. This can cause the driver to pull over, wasting precious time in the face of the emergency. Alternatively, the driver might not pull over due to the emergency, but due to the pursuing police vehicle, the driver can become very nervous and agitated, causing the driver to drive in a dangerous manner.

Additionally, even without the pursuing police officer, the driver's ignoring of local driving rules can put in danger other vehicles whose drivers are unaware of the emergency situation.

According to example embodiments of the present invention, the collaborative navigation app, where the server obtains information from the users to update displays, provides a user-interactable control for inputting an indication of an emergency situation in which the vehicle is driving.

In an example embodiment, a driver using the application is able to use a control provided by the app, e.g., a soft button in the display, to enter that the driver is currently dealing with an emergency.

In an example embodiment, the driver identifies that the vehicle's destination is a location associated with addressing certain kinds of emergencies. For example, the user can input a hospital as a desired destination. In an example embodiment, the server associates certain locations with certain types of emergencies. For example, the server includes a database identifying certain addresses as being of hospitals, and further identifying hospitals as being associated with medical emergencies. If a user inputs an address that is associated with being a hospital, the server identifies that the desired input location is a hospital based on the stored association of the address to hospital indication. Further because the server also includes an association between hospitals and medical emergencies, the server further identifies the input destination as potentially associated with a medical emergency. In an example embodiment, the server not only generally identifies medical emergencies, but also recognizes a plurality of types of medical emergencies with which the requested navigation is potentially associated. For example, the server can identify the following types of potential medical emergencies: woman in labor, choking, heart attack, stroke, burn, deep cut, bullet wound, etc.

In an example embodiment, when a user inputs a desired destination that the server recognizes as potentially being associated with an emergency due to stored associations as described, the server responsively makes available a user interactable component(s) by which to input that the current navigation drive is due to an emergency. For example, in an example embodiment, in response to entry of an address of a hospital, the system enables user entry icons, such as a picture of a baby or pregnant mother to represent a woman in labor, a picture of a broken heart to represent a heart attack, etc. It is noted that alternatively or additionally a user-selectable icon, e.g., a picture of an ambulance, can be provided to represent medical emergencies generally. Additionally, in an example embodiment, the server can provide a free-form input field in which to enter text, such as "medical emergency." In such a case, the server is configured to match the input text to potential recognized emergencies, for example, based on similarity of text and predefined associations, in an example, the system outputs one or more of potentially matching predefined emergencies for the user to select. For example, the driver might input "giving birth," and the system might output "labor" as a suggested emergency.

It is noted that, instead of inputting an address, which the system then associates with a hospital, in an example embodiment, the system provides for the user to initially input the name of the hospital itself. For example, the user can start the app and select a displayed element that opens the option of input of the destination. The user can then type "Maimonides hospital," which the system recognizes as being at a stored address. The system can then set that address as the destination. Additionally, the system can store an association of "Maimonides hospital" as being of the category "hospital," for which the system stores an association with predefined emergencies.

In an example embodiment, when the server receives from a driver of a vehicle (hereinafter "the emergency vehicle") an indication that the current drive is associated with an emergency, the system then adds to navigation displays in a plurality of vehicles running the app and near the vehicle an icon representing the indicated emergency at a location in the map at which the vehicle is presently located. For example, if the user inputs that the current drive is for a woman in labor, the system adds to the displays of the surrounding vehicles an icon that is a picture of a baby or of a pregnant woman. Alternatively, in an example, the system more generally outputs a more generally accepted representation of a medically associated item, such as a red cross. Information regarding the location at which a vehicle located can be obtained, e.g., based on GPS signals or using any conventionally known suitably appropriate means. As the emergency vehicle drives, the server updates the displays in the surrounding vehicles to update the location of the corresponding icon.

This serves to alert the surrounding vehicles that an emergency vehicle is approaching or is otherwise nearby, and therefore to be on alert for potentially erratic driving that does not comply with local driving rules. Police officers too can use such an app and therefore understand that a vehicle driving by above the locally posted speed limit is driving in that manner due to an emergency and might therefore refrain from instructing the vehicle to pull over. Instead, the police officer might drive ahead of the emergency vehicle as an escort.

According to an example embodiment, where a user's, drive has been identified as an emergency drive, the system also updates the map display of the surrounding users to identify the navigation destination of the emergency drive. This can be helpful for a police officer using the application to determine whether the police officer should escort the vehicle or should call for a back-up unit to escort the vehicle, for example, depending on the jurisdiction of the destination. According to an example, whether the destination address is identified is an option selectable by the driver with whom the emergency drive is associated and/or an option selectable by the respective other users using the navigation application in which the map is displayed.

To avoid a scenario where a driver falsely identifies to the server a current drive as an emergency drive, in an example embodiment, the system requires the user to enter as a navigation destination a location that is predefined by the system as being associated with certain predefined types of emergencies. For example, the system can require entry of a location that is predefined in the system as being associated with medical emergencies in order for the system to log the vehicle as an emergency vehicle whose current drive is an emergency drive.

Additionally, to avoid a case of a user inputting as a navigation destination a location associated by the system with a predefined emergency, but where the driver is actually driving to a different location, the system requires the user to follow the suggested navigation route to the input destination. For example, the system initially displays on the displays of the surrounding vehicles the emergency representing icon, but if the driver of the emergency vehicle then veers from the suggested route, the system removes the icon from the displays of the nearby vehicles. On the other hand, drivers often do veer from a suggested route when driving to an input destination. Accordingly, in an example embodiment the system removes the icon only if the driver continuously veers from the suggested route(s) for a predefined extended amount of time. For example, if the driver veers from an initial route, the system recalculates a new route and outputs navigation instructions to the emergency vehicle for the new route to the emergency destination. If the user then follows the new route, then the system continues to display the icon. However, if the driver continuously ignores the navigation instructions for the initial route and for the subsequently output navigation instructions for the updated route after initially veering, then the system removes the icon from the displays of the surrounding vehicles.

In an example embodiment, even after the system removes the icon due to the initial veering of the vehicle from the suggested route for a predefined continuous amount of time, the system adds the icon back if the vehicle then begins to follow the output navigation instructions for a predefined continuous amount of time. It is noted that continuous amount of time can refer to clock time or can refer to a number of navigation instructions, or can refer to a number of possible and actual navigation maneuvers. For example, if the navigation instructions are to drive straight and the vehicle is driving straight, this does not signify following the navigation instructions if the vehicle has not passed any location at which a turning maneuver is possible.

It can occur that a user frequently inputs a location associated by the system with possible emergencies and the user frequently inputs that the user is experiencing an emergency. This can be because the user experiences emergencies often, but it is more likely that the user often travels to a location near the emergency associated location and fraudulently inputs that the user is experiencing an emergency. Therefore, according to an example embodiment, the system logs how frequently the user inputs experiencing an emergency, which, for example, can be a function of a number of times the user inputs experiencing an emergency and a time period in which those emergencies are entered, so that frequency is a function of a ratio of a number of incidents per unit of time. According to an example embodiment, if the user's frequency is above a predefined threshold, then the system stops outputting indications of emergency for that user. In an example embodiment, this is per emergency associated location, so that if the user is blocked for one location, the user is not blocked for another location unless the user abuses the system for that other location as well. According to an example embodiment, if the system blocks a user from having its emergencies indicated on the displays generated for other users, the user can earn trust by stopping to frequently enter emergencies over a predetermined amount of time and/or uses of the application, and the system then responsively unblocks the user so that the user's emergencies are then again indicated.

Emergency personnel, such as doctors and emergency medical technicians (EMTs) might legitimately frequently enter emergencies. Therefore, in an example embodiment, the system provided for entry by a user in a profile identifying the user as emergency personnel. The system is configured to verify the information, for example, by accessing third party systems verifying the user as an emergency personnel, in which case the system does not block the user from frequently entering emergency situations.

In an example embodiment, after a user identifies an input drive as an emergency drive, the system still does not display a representation of the vehicle as an emergency vehicle in the navigation maps displayed in other user devices running the navigation application until the driver with whom the emergency drive is associated begins to follow navigation instructions output by the navigation application into which the emergency drive information has been input. For example, the driver inputs a destination to which the application is to guide the user by outputting navigation instructions. The system then uses signals of a sensors) to determine and follow a location of the vehicle. Based on the following of the location of the vehicle, the system determines whether the vehicle has changed locations in the manner instructed by the output navigation instructions. In an example, the vehicle must be moved for at least a minimum threshold amount of time or vehicle maneuvers before the map data used for generating displays in other devices running the application is updated to include the representation of the emergency drive. The minimum amount can depend on the number, frequency, and/or type of available navigation maneuvers available to the user other than those output by the application, with the user selecting the particular navigation maneuver/direction instructed by the application.

In an example embodiment, if for a threshold amount of time, e.g., five minutes, the driver only has available the navigation maneuver instructed by the application, e.g., the only option from the starting location is to drive straight down a road whose length requires the driving of five minutes, then even though the driver did not have any other option, nevertheless the system updates the map data to reflect the emergency drive once the driver has moved the vehicle for that minimum amount of time.

In an example embodiment, the system stores profiles for users including license plate numbers. When the user enters the state of emergency, the system shows the license plate number together with the emergency icon displayed on the displays of the surrounding users. In this way, the nearby users can more easily and quickly determine which vehicle is experiencing the state of emergency.

In an example embodiment, the system tracks the location of the user device running the navigation application used for inputting the emergency drive using sensor signals, GPS signals and/or cell tower signals (for example, where the navigation application is being run on a smart phone). Additionally, in an example embodiment where, for example, the navigation application is being executed on a device fixed to the vehicle and in communication with vehicle sensors and/or is being executed on a device that can be communicatively coupled to the vehicle sensors, the system also uses vehicle sensor data, such as acceleration/velocity/steering direction sensor data, for tracking the location of the user device. Such tracking is used for accurately updating the map data to include the representation of the vehicle associated with the emergency drive and for tracking whether the user is following the navigation instructions.

DETAILED DESCRIPTION

Figure 1:
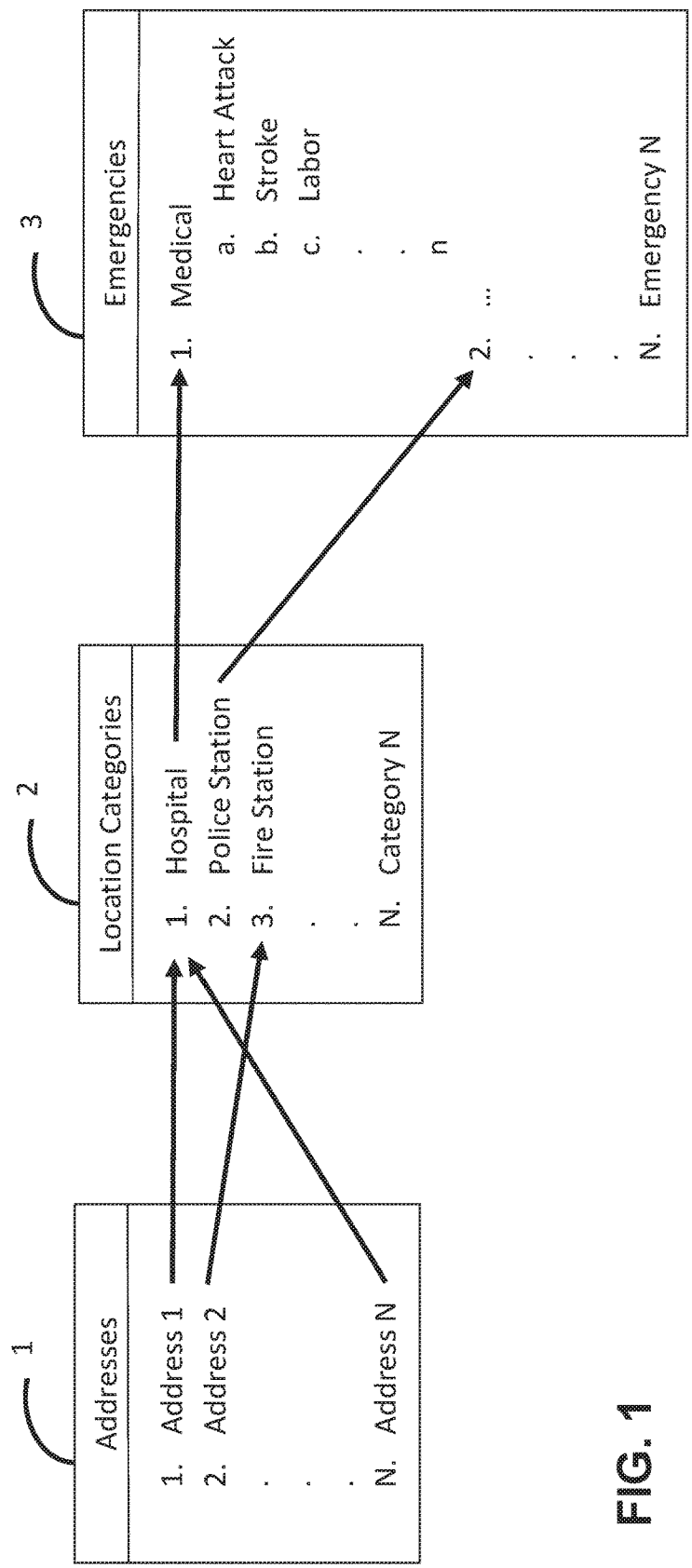
FIG. 1 is a diagram that illustrates a structure of a relational database according to an example embodiment of the present invention.

FIG. 1 illustrates structures that a system stores in a memory device according to an example embodiment of the present invention. For example, the system stores a first data structure 1 listing a plurality of predefined addresses 1-N, a second data structure 2 listing a plurality of categories of locations 1-N, and a third data structure 3 listing a plurality of emergency types. The data structures are stored relationally, for example, using pointers. For example, each of one or more of the addresses, is associated with one or more location categories, and each of one or more of the location categories is associated with one or more of the emergencies. In an example, the emergencies are listed as categories and sub-categories. A location category can be associated with a category, and by such association also be associated with all of its sub-categories. A location category can also be associated with specific sub-categories without being associated with the parent category. Although FIG. 1 shown the indirect association of addresses to emergencies, in an example embodiment, specific addresses can also (or alternatively) be associated directly with specific emergencies, without being associated with location categories.

Figure 2:
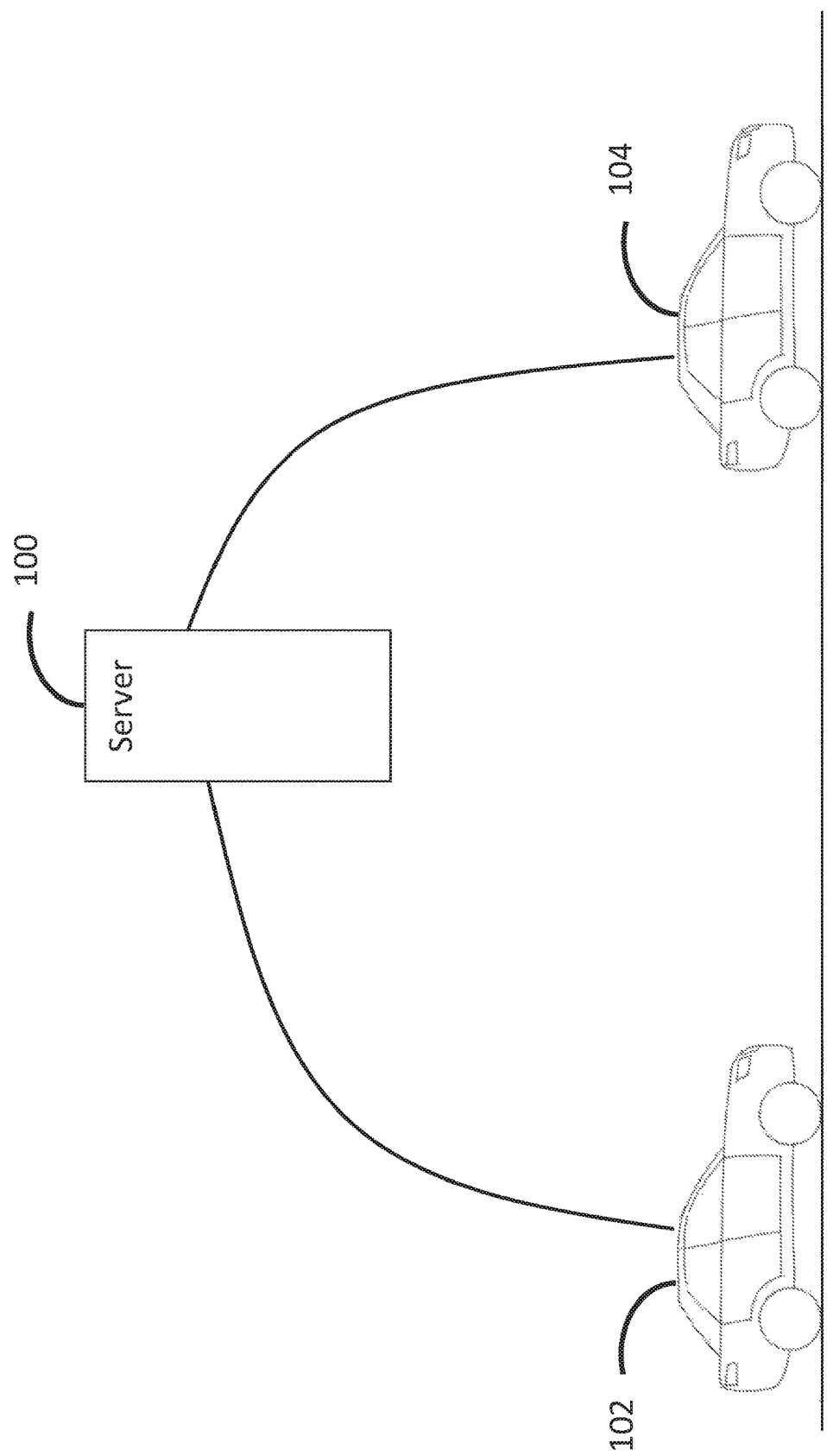
FIG. 2 is a diagram that illustrates an example communication structure between vehicles (or devices running a navigation application for use in a vehicle) and a server providing map data for the navigation application, according to an example embodiment of the present invention.

FIG. 2 illustrates a system including a server 100 and vehicles 102 and 104 that wireless communicate with the server 100 over a wireless communication network. The server 100 includes a memory device with data structures as described with respect to FIG. 1. Each of the vehicles 102 and 104 include a device executing an application that communicates with the server 100 to provide information to the server 100 and receive information from the server 100. It is noted that the device can be a personal computing device, such as a smart phone that can be used for running the application even when not in the vehicle. For example, a user, while home, might use the application for entering a destination for loading route guidance, so that by the time the user enters the user's vehicle, the application can immediately begin outputting the route guidance information. The server 100 is configured to receive from each of the vehicles 102 and 104 an entry, entered using the application, of an address (or location category, and then a selection of an addresses suggested by the server 100 for the indicated location category) for receiving route guidance to the address.

The system is configured so that if a user of the application, e.g., of vehicle 102, enters a location associated in the memory of the server 100 with an emergency, the system outputs on a display of, or connected to, the user device running the application a query inquiring whether the user is experiencing an emergency. If the user responds affirmatively, the system outputs a listing of possible emergencies the user may be experiencing. For example, the listing only lists those emergencies associated with the entered address. Alternatively, the system does not initiate the query as to whether the user is experiencing an emergency, but instead, the application displays a soft button or icon that is selectable buy the user for entering the information that the user is experiencing an emergency. In an example embodiment, the application includes voice recognition so that the user can enter the entries using voice input.

The system is configured so that if a user enters that the user's drive to the user's entered destination location is associated with an emergency with which the entered destination, address is associated by the system with an emergency, the server 100 obtains the emergency information and updates map displays in the vehicle 102 and the vehicle 104 (and other vehicles) to include an icon representing vehicle 102, the icon being positioned in the map in each of the displays at a map location representing the real space location of vehicle 102. For example, vehicle 104 might be located at a real space location that is near the real space location of vehicle 102 so that the map display on the device of the user of vehicle 104 running the application includes a representation of the real space location of vehicle 102, and therefore the system displays the icon representing vehicle 102 at the map location corresponding to the real space location of vehicle 102. It is noted that vehicle 104 need not necessarily be location near vehicle 102. For example, the user of the application of vehicle 104 can shift the map display to distant locations as well.

In an example embodiment, server 100 stores profile information for each of the users. Such information can include license plate number(s) associated with the user (if the user is associated with more than one license plate number, then in an example, the server is configured to receive from the user an entry of which of the license plate numbers is being used for the current drive), a history of entered navigation destinations, and a history of emergency drives asserted by the user. In an example, the server is configured to use the history to determine whether the user is likely falsifying emergency information.

Figure 3:
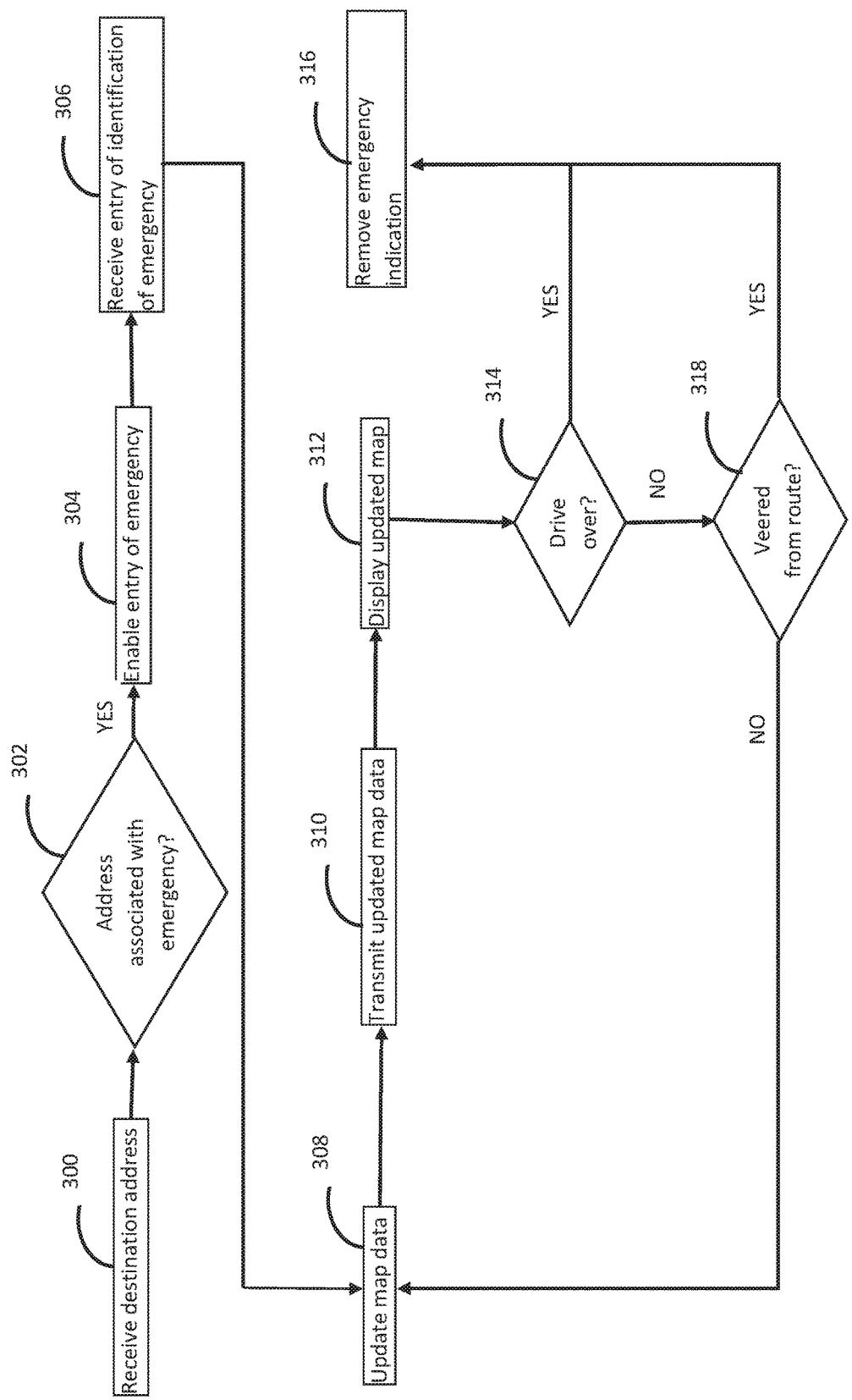
FIG. 3 is a flowchart that illustrates a method of providing map data including a representation of an emergency drive based on sensed data regarding a vehicle driving according to navigation instructions of an application to a destination on an emergency drive, according to an example embodiment of the present invention.

FIG. 3 is a flowchart that illustrates a method according to an example embodiment of the present invention. At step 300, the server receives from the device running the application an identification of an address input by a user using the device running the application. At step 302, the server determines that the address is associated with at least one emergency category. At step 304, the system enables entry of an emergency of the category(ies) determined to be associated with the entered address to be associated with the drive. For example, if the user enters an address associated with hospital, then the system responsively enables entry of a medical emergency generally and/or of specific sub-categories of a medical emergency.

If the user enters presence of an emergency, then, at step 306, the server receives an entered identification of an emergency. At step 308, the server updates the map data to include a representation of the indicated emergency at the map location that corresponds to the real space location of the device running the application, which, when being used in a vehicle, e.g., vehicle 102, is the location of the respective vehicle. At step 310, the server transmits the updated map data to the devices (for example, also including the device associated with the emergency) that are running the application at a location within a predefined distance from the device associated with an emergency. If a device is not within the predefined distance, but the user of that device interacts with the application for requesting display of a map of the location at which the emergency associated device is located, the updated map data, including the representation of the emergency, is provided to such device as well. According to an alternative example embodiment, the representation of the emergency associated vehicle is provided only to those vehicles that are within the predefined distance of the emergency associated vehicle.

In an example embodiment, the application includes an options input via which a user can input an instruction not to show representations of emergency associated vehicles. According to an example embodiment, there is an option of selecting to have the representation be displayed only if within a predefined distance of the emergency associated vehicles. According to an example embodiment, there is an option of selecting to have the representation be displayed only if the emergency associated vehicle is either ahead of the current vehicle on the current vehicle's route or is behind the current vehicle, but is traveling on a route that is expected to lead the emergency associated vehicle onto the same road as the current vehicle within a predefined distance of the current vehicle, which is determined by calculated routes for each of the vehicles and the relative speeds of the two vehicles.

At step 312, the transmitted updated map data is used to display updated maps in each of the display devices of the devices running the application and having received the updated map data.

At step 314, the server determines if the emergency associated vehicle's emergency associated drive has completed. The emergency associated drive can be considered to be over once the emergency associated vehicle has reached its destination or the user of the device of the emergency associated vehicle has turned off the emergency state. If the drive is determined to be over, then, at step 316, the server removes the emergency indication from the map data (it updates the map data to remove the indication, and such updated map data is transmitted to the vehicles). If the drive is determined not to be over, then the server determines at step 318 whether the emergency associated vehicle has veered (e.g., with significance as described above) from the route to the emergency related destination. If the vehicle has been determined to have veered, then the system proceeds to step 316. Otherwise, the system loops back to step 308.

Although step 318 has been described as occurring in sequence and subsequent to step 314, those two steps can be performed simultaneously or approximately simultaneously, or step 318 can be performed prior to step 314. Neither of steps 314 and 318 requires performance of the other of its steps as a prerequisite thereof.

It is noted that, while some of these steps have been described as being performed by the server, in other example embodiments, the local processor of the local user device running the application can perform some of the described steps instead. For example, the local processor can determine if a drive has ended, determine if the user has veered from routing instructions, determine whether an indicated destination is associated with an emergency category, etc. For example, in an example embodiment, the server receives from one or more vehicles indications of emergency related drives and indications of locations of the devices on those drives, updates map data to include such information, and provides the updated information to the plurality of devices running the application, where the devices running the applications use the updated map data received from the server to generate map displays on the local devices and further update the displayed map data to include route information for the respective devices running the applications.

In an example embodiment, the system requires to log-in with log-in information associated with a user profile in order to allow entry of an, emergency state to be associated with a drive and that is used for updating map displays of other users to include the indication of the emergency state entered by the user.

In an example embodiment, at step 304, when the entry of an emergency is enabled, the system outputs, in the display device of the device of vehicle 102 into which the address associated with potential emergencies has been entered as a destination, a set of selectable icons that each is associated with a respective emergency that is associated with the particular address entered by the user, icons of other emergencies not related to the particular entered address being blocked out and/or not selectable.

An example embodiment of the present invention is directed to one or more processors, which can be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors can be embodied in a server or user terminal or combination thereof. The user terminal can be embodied, for example, a desktop, laptop, hand-held device. Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM). Read Only Memory (ROM), Compact Disks (CD), Digital Versatile Disk (DVD), and magnetic tape.

An example embodiment of the present invention is directed to one or more hardware computer-readable media, e.g., as described above, having stored thereon instructions executable by a processor to perform the methods described herein.

An example embodiment of the present invention is directed to a method, e.g., of a hardware component or machine, of transmitting instructions executable by a processor to perform the methods described herein.

The above description is intended to be illustrative, and not restrictive. Those skilled in the art, can appreciate from the foregoing description that the present invention can be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A system directed to controlling a dynamic icon in an electronic display, the system comprising:
    a sensor arrangement; and
    a navigation device that includes a processor, an interface to an external server, an input, and, an output, the output including a display device in which the electronic display is providable;
    wherein
        the sensor arrangement is configured to sense movements of a first vehicle and output signals that identify positions of the first vehicle as the first vehicle drives; and
        the processor is configured to:
            obtain, via the input of the navigation device, selection of a destination;
            based on the selected destination:
                output via the display device a highlighted route to the selected destination that is modified during the first vehicle driving based on the signals output by the sensor arrangement;
                output via the display device the dynamic icon dynamically shifting in the display device to a plurality of positions corresponding to the signals output by the sensor arrangement; and
                control the external server via the interface data for display of the dynamic icon in a plurality of external display devices in a plurality of other vehicles;
                based on the output signals output by the sensor arrangement, identify a navigation-system-significant veering of the first vehicle from a presently set version of the highlighted route;
                responsive to the identified veering, modify the highlighted route successively to a plurality of other versions of the highlighted route that each instructs a new set of vehicle navigation maneuvers; and
                based on the output signals output by the sensor arrangement indicating that the vehicle has performed a plurality of vehicle maneuvers that are inconsistent with a predefined number of successive ones of the vehicle navigation maneuvers of the output highlighted route, while the selected destination remains selected so that the highlighted route continues to be modified and output in the display device, remove the dynamic icon from the display device and control the external server via the interface to remove the dynamic icon from the plurality of external display devices in the plurality of other vehicles.

2. The system of claim 1, wherein the system is configured to,
    after the removal of the dynamic icon, conditional upon the output signals indicating the vehicle performing a predetermined number of successive ones of instructed vehicle navigation maneuvers output by the navigation device, redisplay i-ng the dynamic icon at display locations of the electronic display of the navigation device of the first vehicle corresponding to locations of the first vehicle indicated by the output signals and control the external server via the interface to redisplay the dynamic icon in the external display devices.

3. The system of claim 1, wherein, for each of at least one of the external display devices, the display of the dynamic icon in the respective external display device is performed in response to satisfaction of a condition that the respective external display device is sensed, to be located within a predefined distance from a location of the first vehicle indicated by the output signals.

4. A non-transitory computer-readable medium on which are stored instructions (a) that are executable by a processor of a navigation device of a first vehicle that includes the processor, an interface to an external server, an input, and an output that includes a display device in which an electronic display is providable, and (b) that, when executed, cause the processor to execute a method to control a dynamic icon in the electronic display, the method comprising:
    obtaining from a sensor of the first vehicle that is configured to sense movements of the first vehicle, output signals that identify positions of the first vehicle as the first vehicle drives;
    obtaining, via the input of the navigation device, selection of a destination;
    based on the selected destination:
        outputting via the display device a highlighted route to the selected destination that is modified during the first vehicle driving based on the signals output by the sensor;
        outputting via the display device the dynamic icon, dynamically shifting in the display device to a plurality of positions corresponding to the signals output by the sensor; and
        controlling the external server via the interface data for display of the dynamic icon in a plurality of external display devices in a plurality of other vehicles;

based on the output signals output by the sensor, identifying a navigation-system-significant veering of the first vehicle from a presently set version, of the highlighted route;

responsive to the identified veering, modifying the highlighted route successively to a plurality of other versions of the highlighted route that each instructs a new set of vehicle navigation maneuvers; and based on the output signals output by the sensor indicating that the vehicle has performed a plurality of vehicle maneuvers that are inconsistent with a predefined number of successive ones of the vehicle navigation maneuvers of the output highlighted route, while the selected destination remains selected so that the highlighted route continues to be modified and output in the display device, removing the dynamic icon from the display device and controlling the external server via the interface to remove the dynamic icon from the plurality of external display devices in the plurality of other vehicles.

5. The non-transitory computer-readable medium of claim 4, wherein the method further includes, after the removal of the dynamic icon and conditional upon the output signals indicating the vehicle performing a predetermined number of successive ones of instructed vehicle navigation maneuvers output by the navigation device, redisplaying the dynamic icon at display locations of the electronic display of the navigation device of the first vehicle corresponding to locations of the first vehicle indicated by the output signals and controlling the external server via the interface to redisplay the dynamic icon in the external display devices.

6. The non-transitory computer-readable medium of claim 4, wherein, for each of at least one of the external display devices, the display of the dynamic icon in the respective external display device is performed in response to satisfaction of a condition that the respective external display device is sensed to be located within a predefined distance from a location of the first vehicle indicated by the output signals.

7. The non-transitory computer-readable medium of claim 4, wherein the icon graphically indicates that the first vehicle is in distress.

8. The non-transitory computer-readable medium of claim 7, wherein the outputting of the dynamic icon and the controlling of the external display devices for the display of the dynamic icon is performed in response to satisfaction of a condition that the selected destination is associated, in a memory to which the processor has access, with an emergency service provider.

9. The system of claim 1, wherein the icon graphically indicates that the first vehicle is in distress.

10. The system of claim 9, wherein the processor is configured to display the icon based on satisfaction of a condition that the selected destination is associated, in a memory to which the processor has access, with an emergency service provider.

* * * * *